United States Patent [19]
Ramsey, Jr. et al.

[11] 3,815,027
[45] June 4, 1974

[54] DETACHABLE POTENTIAL INDICATOR CIRCUIT ASSEMBLY FOR INDUCTION WATTHOUR METERS

[75] Inventors: James E. Ramsey, Jr., Raleigh; Auburn K. Griffin, Jr., Sanford, both of N.C.

[73] Assignee: Westinghouse Electric Corporation, Pittsburgh, Pa.

[22] Filed: May 31, 1973

[21] Appl. No.: 365,672

[52] U.S. Cl. ............... 324/137, 324/157, 340/252 R
[51] Int. Cl. ..................... G01r 11/02, G08b 29/00
[58] Field of Search ...... G08b/29/00; 324/137, 113, 324/157; 340/252 R

[56] References Cited
UNITED STATES PATENTS 2,866,158  12/1958  Petzinger ........................ 324/137
3,146,325  8/1964  Gribble .......................... 340/252 R
3,673,608  6/1972  Hoeffel et al. ................... 324/113

*Primary Examiner*—Alfred E. Smith
*Attorney, Agent, or Firm*—R. W. Smith

[57] ABSTRACT

A detachable potential indicator circuit asembly for induction watthour meters includes an auxiliary winding coupled to the leakage flux of a meter coil for energizing a low power indicator lamp. In a preferred form, the assembly is self-contained on a mounting bracket which displays the lamp and positions the auxiliary winding adjacent the meter coil.

9 Claims, 9 Drawing Figures

DETACHABLE POTENTIAL INDICATOR CIRCUIT ASSEMBLY FOR INDUCTION WATTHOUR METERS

BACKGROUND OF THE INVENTION

1. Field of the Invention

This invention relates to a detachable potential indicator circuit assembly for induction watthour meters and more particularly to such an assembly having an auxiliary winding separate from the meter coil and inductively coupled to the coil leakage magnetic flux.

2. Description of the Prior Art

In U.S. Patent application Ser. No. 201,470 filed Nov. 23, 1971 and assigned to the assignee of this invention, a solid state potential indicator assembly is disclosed for an induction watthour meter. In this prior assembly a solid state light emitter is energized by an auxiliary winding wound integrally in the meter voltage coil. Although this arrangement operates satisfactory, it limits potential indicators to meters having the specially constructed voltage coils.

In certain types of watthour induction meters such as those having multiple voltage ranges and those combined with a thermal demand meter, the voltage coils already include additional auxiliary or secondary windings. These additional windings with the associated terminal leads occupy substantially all of the available space so as to preclude an additional potential indicator auxiliary winding in the meter voltage coil. Further space is required in the voltage coil for insulating the voltage winding from the potential indicator auxiliary winding since it is wound as a secondary winding for mounting on a common core.

Also, difficulty has been experienced when high voltage surges are applied to a voltage coil having an integral auxiliary winding. These surges can cause damage to the potential indicator circuit since the auxiliary winding is coupled with the total flux of the voltage coil. Also, in meters designed to operate on power systems having different voltages, for example either 208 or 240 volts, additional specially designed windings are preferable for proper operation of the potential indicator circuits.

To obviate the aforementioned problems encountered with prior art potential indicator circuit assemblies, the present invention is provided with novel construction features and advantages as summarized hereinafter.

SUMMARY OF THE INVENTION

In accordance with the present invention, a detachable potential indicator circuit assembly for induction watthour meters includes an auxiliary winding carried by a bracket relative to an electromagnetic structure having a metering coil so as to be coupled with a leakage magnetic flux path of the coil. The leakage magnetic flux with which the winding is coupled eminates from the electromagnetic structure. A low power indicating lamp is lit by the leakage flux excitation of the auxiliary winding upon proper energization of the metering coil.

It is an important feature of this invention to provide a detachable potential indicator circuit assembly mountable on an existing induction meter without requiring a special metering coil assembly having an integral auxiliary winding. A further feature of this invention is to provide an indicator circuit assembly including an auxiliary winding and an indicating lamp which are both mounted on a bracket so as to form a single self-contained unit. When the bracket is formed of a soft steel magnetic material it provides an efficient magnetic flux path for linking a leakage flux component of a metering coil with the auxiliary winding to define a further shunted path for the coil flux. A still further feature of this invention is to provide an auxiliary winding for energizing a low power indicating lamp in which the auxiliary winding is inductively coupled to the leakage flux of a metering coil so as to provide a substantially constant voltage output to the lamp over an extended range of input voltages to the coil. The higher reluctance coupling through an air gap space between the auxiliary winding and the metering coil flux paths provides substantial surge voltage protection when excessive voltages occur at the input to the metering coil. Other advantages and features of the present invention will be apparent from the description including the drawings described hereinafter.

DESCRIPTION OF THE PREFERRED EMBODIMENT

Figure 1:
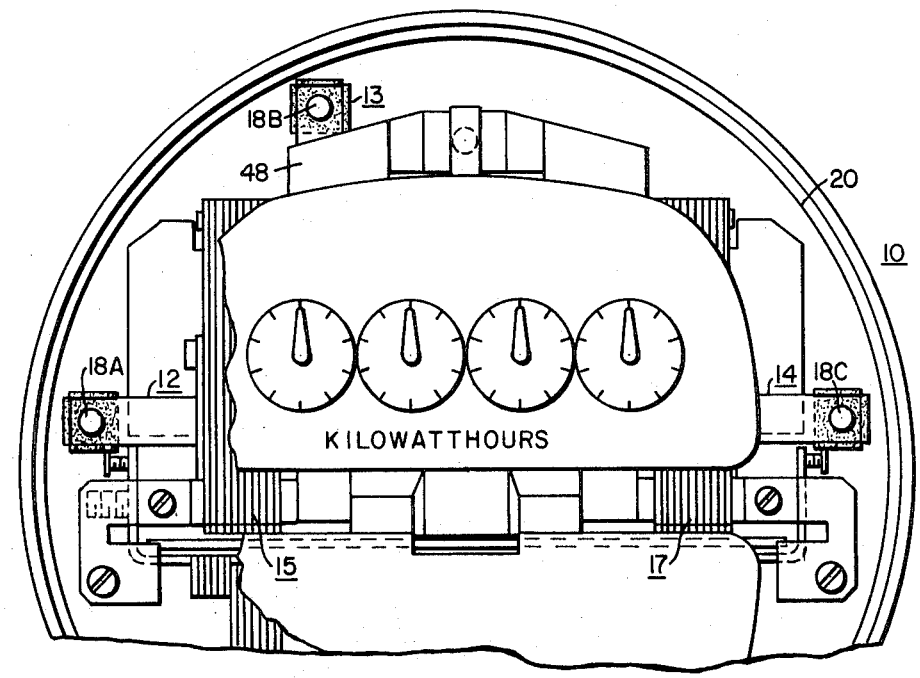
FIG. 1 is a fragmentary front elevational view of a induction watthour meter including three of the detachable potential indicator circuit assemblies made in accordance with this invention.

Referring now to the drawings and more particularly to FIG. 1, there is shown a partial front elevational view of an induction watthour meter 10 including an electromagnetic structure of the multi-element type as disclosed and claimed in U.S. Pat. No. 3,683,276 issued Aug. 8, 1972 and U.S. Pat. No. 3,688,192 issued Aug. 29, 1972, both assigned to the assignee of this invention. Detachable potential indicator circuit assemblies 12, 13 and 14, made in accordance with the present invention are associated with voltage magnetic sections indicated by numerals 15, 16 and 17, respectively, illustrated in FIGS. 1 and 2. As is understood, a current magnetic section is associated with such voltage section as indicated by the letter C below the voltage section 15.

The potential indicator circuit assemblies 12, 13 and 14 are an improvement of the solid state potential indicator disclosed in the aforementioned application Ser. No. 201,470 filed Nov. 23, 1971. As described in this application, potential indicators, generally, are more often utilized in multi-element watthour meters to indicate malfunction or failure in the operation in one of the voltage electromagnet sections. In the circuit assemblies 12, 13 and 14 low power indicating lamps 18A, 18B and 18C are mounted adjacent the meter dial plate 19 for direct viewing when viewing the meter through the front face of a glass cover 20. Each of the lamps 18A, 18B and 18C includes a light-emitting diode (LED) such as a type MV-10B available from the Monsanto Company and type 5082–4850 available from the Hewlett Packard Company, which are rated so as to be lighted with an applied voltage in the order of 1.5 volts. Other low power lamps of the incandescent type may be employed such as, Model BP-1.5/25 available from the Mura Corporation, Great Neck, N.Y.

Figure 3:
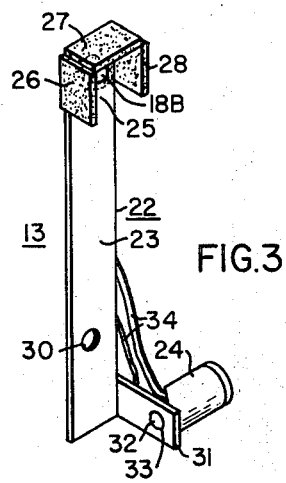
FIG. 3 is an isometric view of one embodiment of a circuit assembly made in accordance with this invention and included in the meter shown at FIG. 1.

The detachable potential indicator circuit assembly 14 is shown in the isometric view of FIG. 3 as it forms a self-contained unit including a bracket 22 supporting the lamp 18B at an upper end and a pickup auxiliary winding 24 at a lower end. The bracket 22 is stamped from a sheet metal material such as magnetic soft steel. An elongated rectangular bracket body 23 carries the lamp 18B in a hole 25 at the upper bracket end. The illuminating portion of the lamp is oriented toward the bracket front side with the lamp terminals extending from the bracket rearward side.

Figure 2:
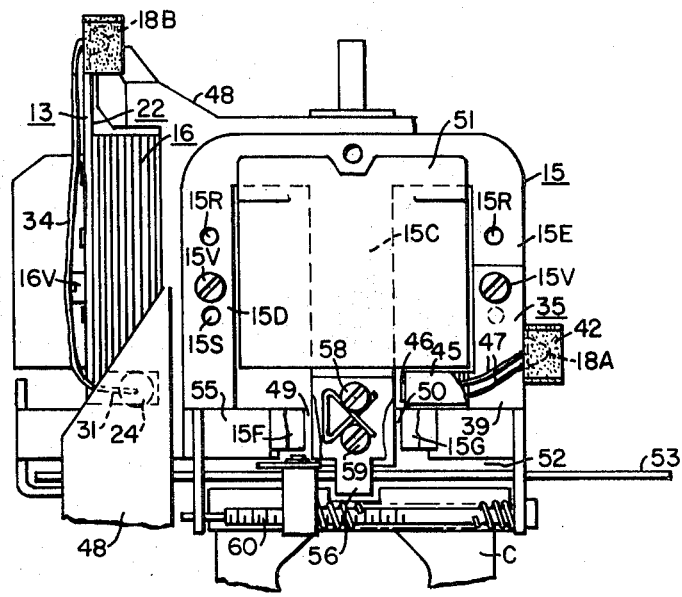
FIG. 2 is a side elevational view of the electromagnetic structure of the meter shown in FIG. 1.

The upper bracket end is initially stamped in a T-shaped configuration to define the tabs 26, 27 and 28. These tabs are bent forward at substantially right angles to the bracket body 23 to enclose the opposite sides and top of the lamp 18B so as to reflect and intensify the lamp light, and also to shade from sunlight for daytime observation. The area adjacent the hole 25 is preferably darkened such as by a coating of black paint to further make a distinctive display of the lamp illumination since the lamp 18B is quite small in size. A mounting hole 30 is provided in the body part 23 for fastening the bracket 22 in a vertical position on the voltage section 16 as shown in FIG. 2 and as described more fully hereinbelow.

A winding support tab 31 is formed integrally with the bracket body 23 and extends forward at a substantially right angle thereto. The winding 24 is carried on a soft magnetic steel pin 32 extending through a hole 33 in the tab 31 so it extends laterally from the bottom of the bracket 22. This positions the winding 24 when the bracket is mounted so it inductively develops a voltage in response to energization of the voltage section 16 sufficient to illuminate the lamp 18B. The winding 24 is preferably formed on a plastic bobbin containing in the order of 800 turns of approximately 0.0045 inch diameter copper wire. The winding 24 is secured to the bracket 22 by the pin 32 extending through the center of the bobbin and through the hole 33. The pin is riveted to the tab 31 so as to clamp the winding 24 between the pin head and the tab 31. The pin 32 as well as the material of the bracket 22 have good magnetic path and permeance characteristics to enhance the inductive coupling of the winding 24. Wire lead conductors 34 extend along the rearward side of the bracket 22 and are connected to the terminals of the lamp 18B.

Accordingly, the shape and dimensions of the bracket 22 as just described are established with respect to a predetermined mounting location so as to expose the lamp 18B for viewing as shown in FIG. 1 and to position the winding 24 at a desired inductive coupling location with the voltage section 16. Before describing the mounting location of the winding 24 which is another important feature of the present invention, the potential indicator circuit assemblies 12 and 14 are described hereinafter.

The detachable potential indicator circuit assemblies 12 and 14 have the same principal parts as described hereinabove for the circuit assembly 13. The configuration of the brackets 35 and 36 of the circuit assemblies 12 and 14, respectively, are for mounting at the left-hand and right-hand sides of the voltage sections 15 and 17, as viewed in FIG. 1. Therefore the shapes are different than for the mounting location of the circuit assembly 13 which is at the rear of the voltage section 16. The brackets 35 and 36 have substantially the same size with the corresponding parts reversely oriented in a mirror image relationship for the left-hand and right-hand mountings.

Figure 4:
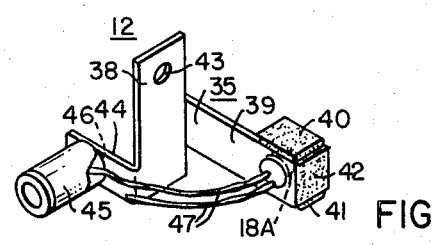
FIG. 4 is an isometric view of a second embodiment of a circuit assembly made in accordance with this invention and included in the meter shown at FIG. 1.

Accordingly, the isometric view of the assembly 12 shown in FIG. 4 is now described in detail, it being understood that the bracket 36 is substantially identical to bracket 35 except for a mirror image relationship of the parts. The bracket 35 includes a rectangular body part 38 and a left-ward extending part 39 at a substantially right angle to a middle portion of the flat faces of the body 38. The outer end of the part 39 is stamped in a T-shaped configuration so as to substantially correspond to the upper end of the bracket 22 shown in FIG. 3. The tabs 40, 41 and 42 extending forward around the top, bottom and left-hand sides of the lamp 18A as to the aforementioned tabs 26, 27 and 28. The body part 38 is intended for vertical mounting and includes a mounting hole 43. A winding support tab 44 extends laterally in an opposite direction from the tab 39 at a right angle from the flat faces of the body 38 at the bottom thereof. An auxiliary winding 45 substantially identical to the winding 24 described hereinabove is carried on the support tab 44 by a soft steel pin 46 so as to extend rearwardly for positioning in a predetermined inductive coupling relationship with the voltage section 15. Wire lead conductors 47 connect the winding 45 to the lamp 18A.

Referring now to FIG. 2 there is shown the upper portion of the three elements of the meter electromagnetic structure having the potential indicator circuit assemblies 12, 13 and 14. The voltage sections 15, 16 and 17 are in arrangement substantially as described in the aforementioned U.S. Pat. Nos. 3,683,276 and 3,688,192. The principal parts of the voltage sections are briefly summarized hereinafter as aid in explaining the mounting and inductive coupling relationships of the present invention. The voltage sections 15, 16 and 17 are mounted on a frame or base 48. Each of these voltage sections includes a laminated core having an E-shaped configuration. The voltage section 15 includes a center winding leg 15C and two outer flux return legs 15D and 15E connected at their upper ends. The lower end of the legs 15D and 15E extend towards the center leg 15C in lateral inward extensions 15F and 15G shown in the cut-away portion of FIG. 2. The extensions 15F and 15G are spaced from the side of the center leg 15C and define flux control gaps 49 and 50.

The voltage section core, as described in the aforementioned two patents further includes a rivet 15R for securing the stack laminations together, a locating hole 15S and machine screws 15V releasably securing the voltage section to the base 47.

The center leg 15C is surrounded by a metering coil of the meter 10 provided by a voltage coil 51 which is constructed of a large number of turns of small diameter insulated copper wire in the manner shown and described in the U.S. Pat. No. 3,496,504 issued Feb. 17, 1970 and assigned to the assignee of this invention. When the voltage winding 51 is energized by the voltage component of an electrical energy system, a working component of the total winding magnetic flux is directed from the axial end or pole face of the center leg 15C axially into the air gap 52 including the meter disc 53.

As further described in the aforementioned two U.S. Pat. Nos. 3,683,276 and 3,688,192, a U-shaped soft magnetic bracket 55 is provided for greater efficiency in the voltage winding flux generation. The tongue 56 extending below the disc 53, the power factor adjusting screw 58, the torque balancing adjusting screw 59 and the light load adjuster 60, being of the general type shown in the U.S. Pat. No. 3,493,862 to Ramsey Jr. et al issued Feb. 3, 1970 and being adjustable as described in the last mentioned patent. All of the last-named magnetic parts establish the magnitude, efficiency and phase relationships for directing the working magnetic flux of the voltage coil 51 from the pole face of the center leg 15C and into the air gap 52 and the disc 53. The working flux returns through the tongue 56, bracket 55 and the two outer legs 15E and 15D. The flux control air gaps 49 and 50, mentioned hereinabove also determine the amount of flux which is directed from the side of the pole end of the center leg 15C in a shunted flux return path including both of the outer legs 15D and 15E to the upper ends thereof. This aids in establishing a shunted portion of the total voltage coil flux that is directed away from the meter disc air gap 52. Flux is also directed into parallel magnetic shunted paths which are adjusted by the screws 58 and 59 provided in the magnetic bracket 55. The associated tongue 56 and a bracket shown in FIGS. 5 and 6 that is associated with the light load adjuster 60 includes a saturating magnetic shunt extending between the outer legs 15D and 15E at the lower end thereof to define further voltage coil flux shunted paths.

Having set forth the general magnetic construction of the voltage section 15, the mounting relationships of auxiliary coil 45 of the circuit assembly 12 is now described. It is to be understood that the mounting of the bracket 36 of the assembly 15 corresponds to the mounting of the bracket 35 of the assembly 12 described hereinafter. Further, the positional and magnetic relationships of the auxiliary windings of each of the assemblies 12, 13 and 14 are all substantially identical as illustrated in FIG. 1. The circuit assemblies 12 and 13 are illustrated in FIG. 2 in their removably mounted positions on the voltage sections 15 and 16. The brackets 35 and 22 are secured at the mounting holes 43 and 30 thereof to the outer legs of the voltage sections by the machine screw 15V and a corresponding machine screw 16V of the voltage section 16. As noted hereinabove, the screws 15V and 16V are already normally provided to secure the voltage sections 15 and 16 to the frame 48 and therefore no additional attaching means is required to mount the circuit assemblies of this invention. However, it is contemplated that other equivalent means for mounting the assemblies 12, 13 and 14 may be provided in accordance with this invention. These mounting positions orient the lamps 18A and 18B of the respective circuit assemblies to be exposed adjacent the dial plate 19 as shown in FIG. 1.

The auxiliary windings 45 and 24 of the circuit assemblies 12 and 13 are shown in the cutaway portion of the voltage sections 15 and 16 being supported on the brackets 22 and 35 so as to be positioned in a closely spaced relationship to the flux control gaps such as shown for the winding 45 of the gap 50. Accordingly, each of the auxiliary windings 46 and 24 extend over one of the lateral extensions of a voltage section outer leg, such as shown for the winding 46 over the extension 15G. This positions the auxiliary windings in a mutually inductive coupled relationship with the leakage flux which eminates from the shunt voltage flux path including a flux control air gap such as 50. This inductive coupled relationship between the leakage flux of the control air gaps has been found to provide enhanced performance of the potential indicator circuit assembly of this invention as described further hereinbelow. As previously noted the magnetic soft steel pins such as the pin 46 aid in coupling the leakage air gap flux of the gap 43 with the auxiliary winding 45.

In all prior arrangements for providing potential indicators, an auxiliary winding providing the energization of a potential indicator lamp is wound in the center leg of the voltage section along with the voltage coil such as coil 15 so as to be in a direct mutually inductive coupled relationship with the center leg and the voltage coil. This then requires an internal winding arrangement which is integral with the voltage coil and requires that any meter having a potential indicator must also have a specially provided voltage coil with the auxiliary potential indicator auxiliary winding included therein.

In installation of the detachable potential indicator circuit assemblies 12, 13 and 14 it is seen that these may be provided on a watthour meter 10 without any special modifications of the watthour meter parts. After the auxiliary windings of the circuit assemblies are positioned in the space between the voltage section center and outer legs and adjacent an associated control gap and with the mounting holes aligned with the existing holes in an outer core leg, the screws such as 15V are applied to secure a circuit assembly to the voltage section and, accordingly, both of these parts to the meter frame 48. When desired, the circuit assemblies of this invention may be removed simply by removal of the machine screws and separation of the circuit assemblies from the meter electromagnetic structure.

The operation of circuit assembly 12 is explained with respect to the voltage section 15 it being understood that a corresponding operation is provided by the assemblies 13 and 14 at the voltage sections 16 and 17. The voltage coil 51 is energized during the normal meter operation for aiding in producing rotation of the disc 53 which provides the indication of the pointers associated with the dial plate 19. The main flux produced by the voltage coil 51 is principally coupled to the center leg 15C so that the predetermined amount of working flux flows from the pole face of the center leg 15C to cooperatively drive the disc 53 along with a current responsive flux also produced in each element of the electromagnetic structure. The shunted flux portions of the voltage coil flux flows from the center leg through various magnetic paths provided by the magnetic parts of the voltage section 15 as noted hereinabove. The flux of these and principally of the flux through the control gaps 49 and 50 have leakage components which eminate into the air. The leakage flux of the air gap 49 is coupled by the winding 45 as also noted above. This path returns the leakage fluxes through the auxiliary windings, its core formed by the pins, the brackets on the outer legs of each voltage section and into outer legs connected to the voltage coil center legs. Accordingly, this defines a further path, in addition to those of the magnetic elements of each voltage section, for the coil flux shunted from the working flux path.

The voltage induced in the auxiliary winding 45 produces an output voltage at the wire lead conductors thereof in the order of between 1.2 to 2 volts which is sufficient to illuminate the lamp 18B providing an indication of a proper operation of the voltage section 15.

It has been found that variation in the voltage supplied to the voltage coil 51 does not substantially vary the output voltages of the auxiliary windings of the circuit assemblies 12, 13 and 14. In one specific example, the watthour meter 10 may be of a type normally connected to polyphase systems having a 240 volts applied to the voltage coils of each voltage section. This type of meter may also be connected to a similar system characterized as a four-wire, delta connected polyphase system in which the normal 240 volts is reduced to 208 volts applied across the voltage coil 51. Experience with prior art potential indicator auxiliary windings which are wound integral with the voltage coil 50 are that a different design would be preferable to generate sufficient voltage for normal operation when 208 volts is applied to the voltage coil 51. This is desirable since the prior art integrally wound potential indicator windings are mutually coupled with the total or main flux of the voltage coil 51 and have a corresponding lower output voltage when the voltage being applied to the voltage winding 50 is lowered.

In a potential indicator circuit assembly made in accordance with this invention the voltage regulation is substantially constant without substantial variation between the 240 volts and 208 volts operation such that a substantially constant voltage output from the winding 45 is applied to the indicating lamp 18A. It is believed that the reason for the improved voltage regulation in the present invention is due to the mutually inductive coupling relationship of the auxiliary windings with the leakage flux passing through an air gap space which has less variation with changes in the voltage applied to the voltage coil than there is variation in the main voltage flux associated with the center leg 15C.

In another important aspect of this invention, the elements of the watthour meter 10 must be designed to be subjected to substantially high voltage surges which may occur on the power systems to which the meter 10 is connected. It is possible under certain conditions that the prior integral or internally wound potential indicator auxiliary windings are damaged when the voltage coil is subjected to high voltage surges since it is directly and mutually coupled to the main voltage coil flux. Similar surges do not have this destructive effect on the auxiliary windings of the present invention. This is believed to be provided since the coupling with the air gap leakage flux is through a high reluctance air space path and the coil is formed with substantially more turns than the previously employed internally wound potential indicator auxiliary windings so as to have substantially more inductance and therefore less susceptible to damage from high voltage surges. For example, often the prior internally wound potential indicator auxiliary windings have less than 100 turns whereas the number provided in the above described one embodiment of the auxiliary windings of the present invention is in the order of 800 turns.

Figure 6:
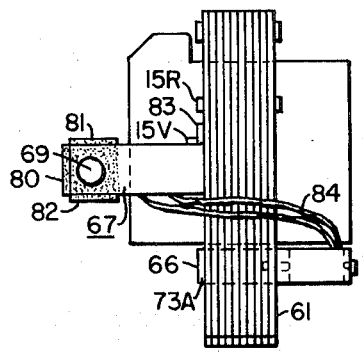
FIG. 6 is a front elevational view of the voltage section shown in FIG. 5.
Figure 5:
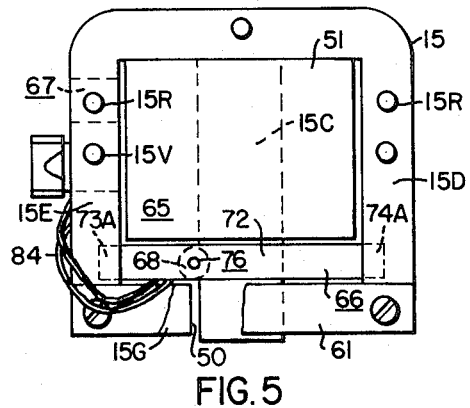
FIG. 5 is a side elevational view of a voltage section of the electromagnetic structure shown in FIG. 2 including a third embodiment of a circuit assembly made in accordance with this invention.
Figure 7:
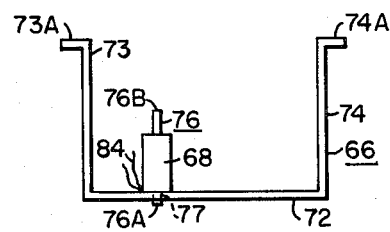
FIG. 7 is a top separate view of the circuit assembly shown in FIGS. 5 and 6.

Referring now to FIGS. 5, 6 and 7, there is shown a detachable potential indicator circuit assembly 65 which is another embodiment of this invention. The circuit assembly 65 is shown mounted on a voltage section corresponding to the section 15 described hereinabove and the same parts are designated with the same numerals with some of which are cut away for clarity in the drawing. A two-piece bracket assembly including a U-shaped bracket part 66 and a laterally extending part 67. The part 66 supports an auxiliary winding 68 which corresponds to the auxiliary windings 24 and 45 described hereinabove. The bracket part 67 is separate from the bracket 66 for carrying the lamp 69 which corresponds to the above described lamps 18A, 18B and 18C. The bracket part 67 extends to the left-hand side of the front of the voltage section 15 as does the assembly 12 shown in FIG. 1 to position lamp 69 as the bracket 35 positions lamp 18A as described hereinabove.

The bracket part 66 has a bottom 72A extending to opposite legs 73 and 74 extending at substantially right angles to the end 72 as shown in FIG. 7. The part 66 is made of the sheet magnetic soft steel with the legs 73 and 74 being resiliently bendable inwardly. The outer ends of the legs 73 and 74 are terminated by laterally outwardly extending tabs 73A and 74A. The auxiliary winding 68 is secured to the bottom 72 by a solid magnetic soft steel pin 76 which has a head 76A and shank 76B insertable through a hole 77 in the bottom 72. The shank 76B forms a core of the winding 68 and is extended beyond the end of the winding 68 for positioning as a magnetic flux pickup part over the control air gap 50 shown in FIG. 2 when the bracket 66 is positioned as shown in FIGS. 5 and 6.

The bracket part 67 has an outer end formed substantially as is the outer end of the bracket 35 having tabs 80, 81 and 82 bent forward to surround the three outer sides of the lamp 69. The inner side of the bracket 67 includes a portion bent at right angles to the laterally extending part of the bracket so as to extend vertically and includes a hole 83 which receives the machine screw 15V as does a hole 43 of the bracket 35. Wire leads 84 extend from the winding 68 to the terminals of the lamp 69.

The bracket part 66 is mounted in place from the inner side of the voltage section 15 in the space below the voltage coil 51 and above the light load adjusting bracket and soft magnetic shunt 61 extending on the inner side of the voltage section 15. The legs 73 and 74 are resiliently bent toward each other to permit clearance of the outer edges of the tabs 73A and 74A to pass along the inner sides of the voltage section legs 15D and 15E. When the tabs 73A and 74A clear the outer side of the voltage section 15, they are released to spring the leg parts 73 and 74 back against the section legs 15D and 15E with the tabs 73A and 74A overlapping the outer sides thereof. Thus, the bracket 66 is resiliently held in place without the use of additional screws or other fastening means.

In the assembled position shown in FIGS. 5 and 6, the bracket 66 positions the auxiliary winding 68 immediately outside voltage section core next to the center leg 15C. The extended shank part 76B of the pin 76 is positioned immediately over the control air gap 50 so that the pin is inductively coupled close to the air gap leakage flux and aids in coupling the auxiliary winding 68 with the leakage flux eminating from the air gap 50. Thus, in the assembly 65 the auxiliary winding is mounted externally to the voltage section 15 to be mutually coupled with the leakage air gap flux rather than positioned immediately over the gap and between the center leg 15C and outer leg 15E as described hereinabove for the position of the auxiliary windings 24 and 45.

The operation of the circuit assembly 65 shown in FIGS. 5 and 6 is substantially identical to that described hereinabove for the operation of the circuit assemblies 12, 13 and 14.

Figure 8:
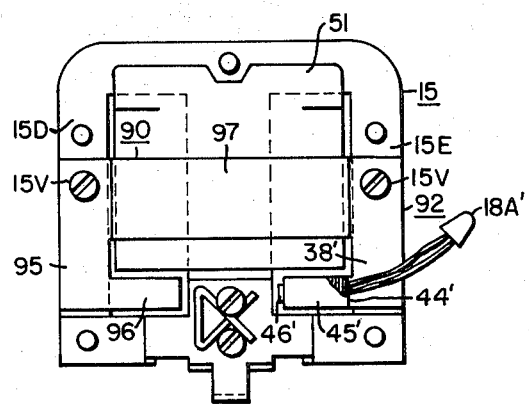
FIG. 8 is a side elevational view of a voltage section including a fourth embodiment of a circuit assembly made in accordance with this invention.
Figure 9:
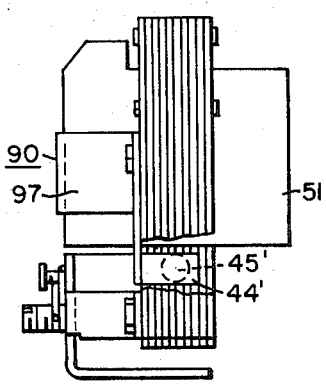
FIG. 9 is a front elevational view of the voltage section shown in FIG. 7 with a portion thereof cut away.

In FIGS. 8 and 9 a still further embodiment of a detachable potential indicator circuit assembly 90 is partially shown made in accordance with this invention. The circuit assembly 90 is shown exclusive of an indicating lamp and mounting on the voltage section 15 described hereinabove. The assembly 90 includes all of the structural features of the circuit assembly 35 except part 39 and an associated lamp and further includes an additional magnetic balancing feature to aid in providing a more uniform balanced magnetic flux distribution effect upon the magnetic fields of the voltage section 15.

A symmetrically shaped bracket 92 of the assembly 90 includes a portion 38' having substantially the same size as part 38 of the bracket 35 shown in FIG. 4. The portion 38' extends along the voltage section leg 15E for attaching thereto by the screw 15V. A tab portion 44' carries an auxiliary winding 45' on a pin 46' which correspond in position and operation to the elements 44, 45 and 46, respectively, described above.

A portion 95 corresponding to the portion 38' extends along a similar area of the outer leg 15D and is held in place by a screw 15V. An integral extension 96 extends from the lower end of the bracket portion 95 toward the center leg 15C. The extension 96 terminates substantially adjacent the control air gap 49 to magnetically correspond to the relationship of the auxiliary winding 45 adjacent the other side of the center leg 15C and the control air gap 50. This arrangement tends to more symmetrically balance the magnetic leakage flux distribution at the lower end of the center leg 15C which is helpful in maintaining the meter light-load adjustments.

The bracket 92 further includes a bridging portion 97 which, as shown in FIG. 9, extends laterally outward around the outer side of the voltage coil 51 between he portions 38' and 95. This makes an integral symmetical bracket arrangement and the bracket 92 may include a part 39 with a lamp 18A attached to the portion 38' as it is shown in FIG. 4 attached to the corresponding part 38 to form a single self-contained assembly. Alternatively, a separate bracket part such as part 67 shown in FIGS. 5 and 6 may be used for mounting an associated indicating lamp to be connected to the winding 45'. Further, it is contemplated that a lamp may be mounted on a part of a watthour meter other than on the voltage section as illustrated in the drawings.

It is contemplated that other alternative embodiments of a detachable potential indicator circuit assembly may be made in accordance with this invention. For example, the assembly auxiliary winding may be coupled with a leakage flux path of the metering voltage coil other than at the locations described above. The several paths for the voltage coil magnetic flux distribution described afford various locations for inductively coupling the auxiliary winding of each assembly. Also auxiliary magnetic parts may be used to form additional paths for linking with the voltage coil magnetic flux.

We claim:

1. An improved potential indicator circuit assembly for an induction watthour meter characterized by voltage and current electromagnet sections mounted adjacent an air gap receiving a disc rotatable in response to magnetic fluxes directed into the disc air gap from the voltage and current sections, wherein said voltage section includes a magnetic core carrying a voltage coil such that a working magnetic path of said coil flux includes said disc air gap and a plurality of shunted magnetic flux paths are included in flux return paths of said coil, said improved potential indicator circuit assembly comprising:

an auxiliary winding;
a removable bracket made of a soft magnetic material and mounted so as to define a further return path for the shunted magnetic fluxes of said voltage coil, said bracket carrying said auxiliary winding in a substantially exclusively mutually coupled relationship with a leakage component of one of said shunted magnetic flux paths; and
a low power lamp mounted for viewing from the face of the meter and connected to said auxiliary coil so as to be lighted in response to energization of the voltage coil.

2. An improved potential indicator circuit assembly as claimed in claim 1 wherein said magnetic core of the voltage section includes a flux control air gap for establishing the magnitude of magnetic flux in one of said shunted magnetic flux paths, and wherein said leakage component of the shunted magnetic flux radiates from said flux control air gap.

3. An improved potential indicator circuit assembly as claimed in claim 2 wherein said bracket is formed of an integral one-piece construction including one bracket part carrying said low power lamp and another bracket part carrying said auxiliary winding.

4. An improved potential indicator circuit assembly as claimed in claim 3 wherein a screw fastening means secures the voltage section in place in said meter, and wherein one of said bracket parts includes an opening for receiving said screw fastening means such that both the voltage section and the bracket are held in place by the fastening means.

5. An improved potential indicator circuit assembly as claimed in claim 3 wherein said one bracket part includes integral tabs partially enclosing said lamp.

6. An improved potential indicator circuit assembly as claimed in claim 3 wherein said core assembly includes an E-shaped laminated structure with a center leg receiving said voltage coil and a pair of outer legs included in the flux return paths with one of the outer legs being included in a common path with said flux control air gap, and wherein a fastening means secures said bracket to the one outer leg, and further wherein another bracket part positions said auxiliary winding between the one outer leg and said center leg.

7. An improved potential indicator circuit assembly as claimed in claim 1 wherein said bracket includes a flux pick up extending part for positioning in the path of said leakage flux component so as to establish said mutually coupled relationship with said auxiliary winding.

8. An improved potential indicator circuit assembly as claimed in claim 1 wherein said magnetic core includes an E-shaped laminated structure having a center leg receiving said voltage coil and a pair of outer legs including said flux return paths, and wherein said bracket includes a U-shaped member having resilient leg portions insertable between inner sides of said outer legs and resiliently engaging said outer legs.

9. An improved potential indicator circuit assembly as claimed in claim 1 wherein said bracket includes complementary shaped parts being positional in symmetrically spaced relationship relative to said voltage coil so as to substantially balance the mutual coupling of said auxiliary winding.

* * * * *